Feb. 21, 1961

P. AKERMANN 2,972,310

ELECTRIC MOTOR

Filed Nov. 12, 1958

INVENTOR.

Paul Akermann

BY

Richards Geier

ATTORNEYS

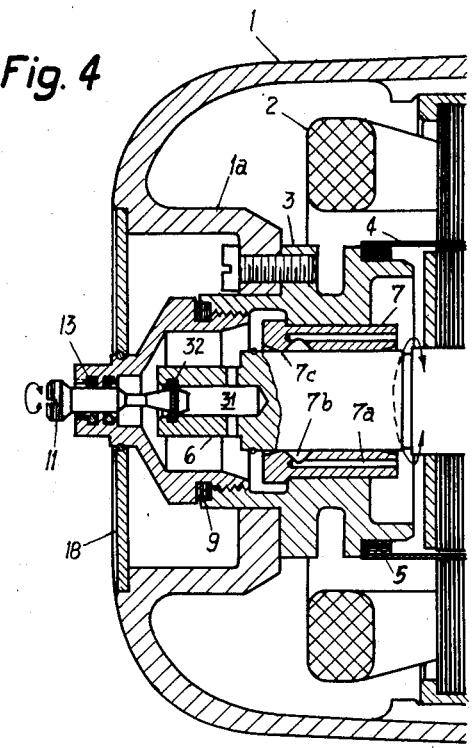
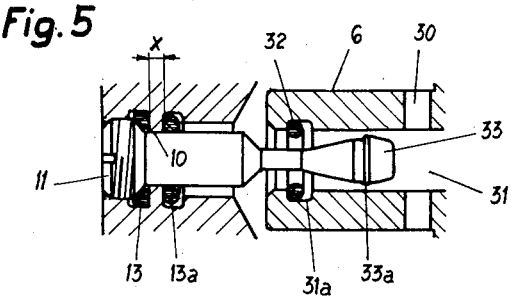

United States Patent Office 2,972,310
Patented Feb. 21, 1961

2,972,310
ELECTRIC MOTOR

Paul Akermann, Birsfelden, Switzerland, assignor to E.M.B. Elektromotorenbau A.G., Birsfelden, Switzerland, a company of Switzerland Filed Nov. 12, 1958, Ser. No. 773,207

4 Claims. (Cl. 103—87)

The present invention relates to an electric motor and more particularly to an electric motor forming together with a driven member a complete unit.

In such electric motors particularly if they are used to drive pumps and are consequently enclosed in a common casing therewith, as this is the case with the jacket-type motors for circulating pumps, the problem often arises of determining the direction of feed of the circulating pump, i.e. whether the actual direction of rotation of the impeller thereof corresponds to its proposed feed direction. This in turn depends upon the direction of rotation of the electric motor driving the pump, which direction is determined in many cases by the manner in which the terminals of this motor are connected to the source of electric current. Thus it becomes often necessary to ascertain whether the electric motor rotates in that direction which ensures proper operation and direction of feed of the pump. The present invention is therefore concerned with an improved means for determining the direction of rotation of electric motors which are completely enclosed by a casing.

It is an object of the present invention to provide means permitting to indicate in a simple and reliable manner the direction of rotation of an electric motor during operation, at the outside of the casing thereof.

A further object of the present invention is the provision of means in an electric motor having a completely closed casing, facilitating the safe indication of the direction of rotation of the electric motor at the outside of the casing thereof during operation.

Another object of the present invention is the provision of means for indicating the direction of rotation of an electric motor at the outside of the casing of the latter, which are movable between an inoperative position out of contact with the rotor of the electric motor and an operative position in contact with this rotor under the action of pressure within said casing maintaining said means in driven engagement with said rotor.

Still another object of the present invention is the provision of an indicating member for indicating the direction of rotation of the shaft of a pump and motor assembly at the outside of casing thereof, which member is movable between an operative and an inoperative position and which in both of these positions will effectively seal the casing against leaking of the pump fluid.

These and other objects of the present invention will become better apparent from the following description, reference being made to the accompanying drawing, in which:

Fig. 4 shows a modified embodiment of a split-tube motor in accordance with the invention in axial section;

Fig. 5 shows the indicating member of Fig. 4 on an enlarged scale.

Figure 1:
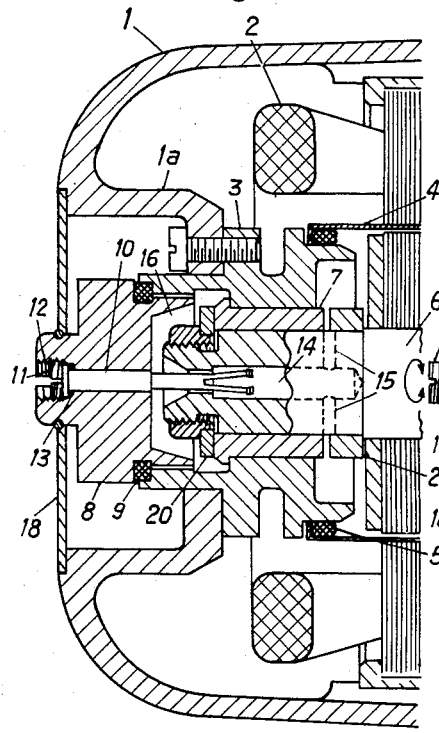
Fig. 1 shows in axial section a bearing end portion of an electric motor for a circulation pump embodying the invention.
Figure 2:
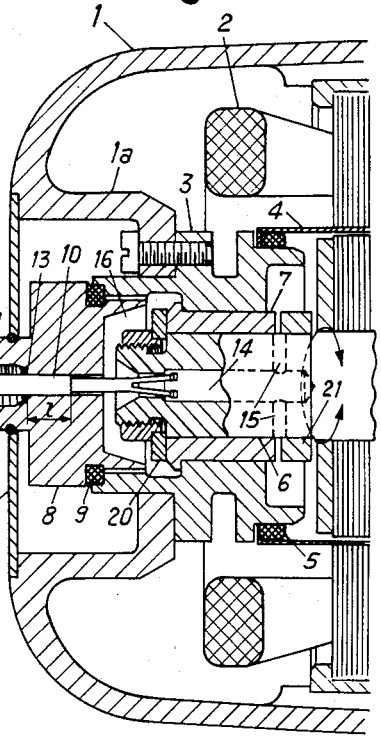
Fig. 2 is a section corresponding to the one in Fig. 1, with the indicating member in the indicating position thereof.
Figure 3:
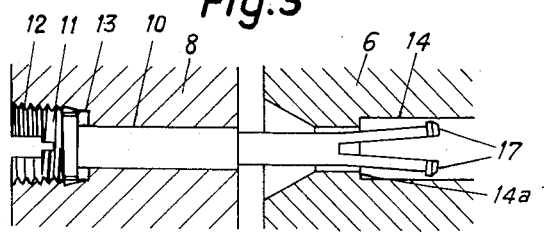
Fig. 3 is a detail view of the indicating member of Figs. 1 and 2 in an inoperative position and shown on an enlarged scale.

Referring now more particularly to Figs. 1–3 of the drawing, 1 indicates a housing of an electric motor driving a fluid circulation pump not shown. The pump may for instance be of the type disclosed in my copending application Ser. No. 773,205 as used for circulating water in central heating systems. The housing 1 of the electric motor contains a stator 2 and is provided on its face side with a circular recess 1a to the inside of which a bearing member 3 is screwed.

On the bearing member 3 there is supported one end of a tube 4 of cylindrical form, a sealing ring 5 being arranged between the bearing member and the tube to prevent pump fluid from passing from the interior of the tube into the portion of the housing containing the stator 2. The tube 4, which surrounds the rotor, extends through the air gap between this rotor and the stator 2. A rotor shaft 6 is supported in the bearing member 3 by means of a bearing bush 7 which is secured rigidly to the bearing member 3 and which limits the movement or play of the shaft in axial direction by means of two discs 20 and 21 secured to the shaft for rotation therewith at both ends of the bush. Inserted into the end of the bearing member 3 and protruding into the recess 1a, is a cap member 8, a sealing ring 9 being arranged between the cap member and the bearing member 3. The cap member 8 has a central bore 10 arranged coaxially to the shaft 6 and containing an indicating member 11 in the form of a bolt provided with a threaded head portion. In the position shown in Fig. 1 representing the inoperative position, the member 11 is screwed by means of its threaded head portion into a threaded bore 12 and forced against a sealing ring 13 arranged in a bore 12. At its end opposite to the head portion the member 11 forms a twin-tonged fork portion, which extends into a bore 14 provided in shaft 6.

The bore 14 communicates through a number of radial bores 15 with the interior of the tube 4 in which the medium circulated by the pump is maintained under pressure. When the pump is in operation the medium, therefore, flows through the bores 15 into the bore 14 and after passing the indicating member 11, into the space 16 formed between the cap 8 and the bearing piece 3.

To afford an indication of the direction of rotation when the electric motor is running, the indicating member 11 is unscrewed by means of its threaded head from the threaded bore 12, with the result that this member will be shifted outwardly in axial direction under the pressure of the hydraulic medium. Thus the two slightly spread fork tongues come into contact with a tapered portion of the bore 14 in the shaft 6, while at the same time the pressurized medium tends to maintain the member in this operative position. Owing to the contact between shaft and member 11, the latter is entrained by the shaft and rotated while guided in the bore 10. Consequently, it is easily possible to determine the direction of rotation of the shaft by referring to the head of the indicating member protruding from the housing. To prevent the stud from being forced out of the bore 14 of the shaft 6 by the fluid pressure, each fork tongue of the stud is provided with a dog 17 which engages a shoulder 14a formed in the bore 14 when the stud reaches its operative outer end position (Fig. 3). From the direction of rotation of the member 11 the direction of rotation of the electric motor and the direction of feed or circulation of the pump may be determined.

As shown in Fig. 2, the indicating member 11 seals the bore 10 also in its operative or outer end position, the cylindrical portion of the member co-acting along a distance 1 with the wall of the bore 10.

When the direction of rotation of the shaft has been determined, the member 11 is manually pushed inwardly, with the result that the latter will be disengaged from the shaft and stop rotating. It is then possible to screw the member with its threaded head back into the threaded bore 12 by means of a screw driver and tighten it against the sealing ring 13. In its inner end position, the member 11 in conjunction with the sealing ring 13, closes and seals the bore 10 against any leakage of fluid therethrough.

It will be seen from Figs. 1 and 2 that the housing end having the recess 1a may be provided with an annular cover disc 18 removably secured to the cap 8 by conventional means such as a spring ring or the like.

The indicating member 11 is preferably made of corrosion-resistant material, e.g. stainless steel.

In the modified second embodiment of the invention as represented in Figs. 4 and 5, the rotor shaft 6 has a coaxial bore 31 communicating through radial bores 30 with the space 16. The bearing bush 7 contains several bores 7a extending parallel to the axis of this shaft and communicating with the split space of the motor and also with an annular groove 7b provided in the internal wall of the bush.

For the medium subjected to the feed pressure of the pump and flowing into the peripheral groove 7b, shaft 6 and bearing bush 7 form a throttle portion at 7c through which entry of the medium into the space 16 is restricted and the pressure reduced. The reduced pressure of the medium is transmitted through bores 30 and 31 on to a piston end 33 of the member 11 which, in the indicating position represented in Fig. 4, is forced by means of its shoulder 33a against a rubber ring 32. This rubber ring is accommodated in a peripheral groove 31a of the bore 31 and by virtue of its inherent tension is in frictional engagement with the shaft 6, thus causing the indicating member 11 to be rotated when the latter is pressed against this ring.

To allow for certain radial displacement of the two bores 10 and 31 with respect to one another without causing the stud to jam in the bore 10, the guide length X of the indicating member in this bore has been selected as being very small. A seal 13a prevents the fluid from flowing out when the indicating member is in operative position. Thus it is possible to determine the direction of rotation of the shaft by referring to the head of the stud protruding from the housing in the operative position.

It is of course within the scope of the present invention to design other types of electric motors in the manner described, in order to permit indication of the direction of rotation by means of an indicating member. Thus, it is conceivable, for instance, to have the member forced against the shaft, shifted from its inoperative to its operative end position, by a spring instead of by the action of the fluid pressure. Instead of the stud being secured in the cap by means of a threaded portion, it may be held in its inoperative end position by a clamp or snap mechanism.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An electric motor-pump assembly for circulating a pressure medium comprising a casing, an electric motor having a stator and a rotor, said rotor including a shaft rotatably supported by said casing, said shaft having a concentric bore therein, an impeller seated on said shaft for rotation therewith to circulate said pressure medium, a side wall in said casing having a bore concentrically arranged with respect to said shaft and extending from the interior of said casing to the exterior thereof, an indicating member rotatably supported in said bore of said side wall and displaceable therein between an inoperative and an operative position, said indicating member extending into said bore in said shaft, said indicating member being in driven engagement with said shaft and extending to the outside of said casing when in said operative position and out of engagement with the latter when in said inoperative position, respectively, and channel means connecting said bore in said shaft with said impeller and transmitting the pressure of said medium from said impeller into said bore in said shaft and to said indicating member during rotation of said shaft to displace said indicating member into said operative position and maintain the latter in driven engagement with said shaft under said pressure, to thereby indicate the direction of rotation thereof at the outside of said casing due to corresponding rotation of said indicating member.

2. In a motor-pump assembly including a circulating pump for a fluid, an electric drive motor for said pump, and a casing surrounding said motor and said pump, said motor having a stator and a rotor, said rotor including a shaft rotatably supported by said casing, a tubular member surrounding said rotor and enclosing said stator together with said casing in fluid sealed relation, said tubular member forming internally thereof a fluid chamber communicating with said pump; a device for indicating the direction of rotation of said rotor comprising a bore in said casing concentrically arranged with respect to said shaft and extending from the interior of said casing to the exterior thereof, a coaxial bore in said shaft having an end adjacent said bore in said casing and communicating with said fluid chamber in said tubular member, said bore having a neck portion of reduced diameter at said one end, and an indicating member rotatably supported in said bore and extending into said bore in said shaft through said one end, said indicating member being displaceable therein between an inoperative and an operative position and having means for engagement with said neck portion in said shaft, said indicating member being in driven engagement with said shaft over said engagement means and said neck portion, respectively, and extending to the outside of said casing when in said operative position and out of driven engagement with said shaft when in said inoperative position, said fluid when circulated by said pump during rotation of acting over said fluid chamber and said bore in said shaft to displace said indicating member into said operative position and maintain the latter in driven engagement with said shaft to indicate the direction of rotation thereof at the outside of said casing due to corresponding rotation of said indicating member.

3. An indicating device according to claim 2, wherein said engagement means of said indicating means is formed by a resilient forked portion.

4. An indicating device according to claim 2, wherein said engagement means of said indicating member is formed by a resilient ring.

References Cited in the file of this patent
UNITED STATES PATENTS 2,688,946     Jarsaillor     Sept. 14, 1954
2,766,695     Gailloud     Oct. 16, 1956